Jan. 6, 1953        R. A. EMMETT, JR        2,624,872
TEST INSTRUMENT FOR BLIND LANDING SYSTEMS
Filed Nov. 26, 1945        5 Sheets-Sheet 3

Inventor
ROBERT A. EMMETT, JR.
By M. O. Hayes
Attorney

Jan. 6, 1953   R. A. EMMETT, JR   2,624,872
TEST INSTRUMENT FOR BLIND LANDING SYSTEMS
Filed Nov. 26, 1945   5 Sheets-Sheet 4

FIG. 4

Inventor
ROBERT A. EMMETT JR.
By M. O. Hayes
Attorney

Jan. 6, 1953 — R. A. EMMETT, JR — 2,624,872
TEST INSTRUMENT FOR BLIND LANDING SYSTEMS
Filed Nov. 26, 1945 — 5 Sheets-Sheet 5

Inventor
ROBERT A. EMMETT JR.
By
Attorney

Patented Jan. 6, 1953

2,624,872

UNITED STATES PATENT OFFICE 2,624,872

TEST INSTRUMENT FOR BLIND LANDING SYSTEMS

Robert A. Emmett, Jr., United States Navy

Application November 26, 1945, Serial No. 630,958

6 Claims. (Cl. 343—5)

(Granted under Title 35, U. S. Code (1952), sec. 266)

This invention relates to test instruments and, more particularly, to an electronic device for use in conjunction with the airborne components of a blind landing system to generate artificial position and course defining signals and test the response of the airborne component thereto.

This test unit is particularly designed to operate in conjunction with the system described in the copending application of T. R. Burnight et al., Serial No. 629,688 filed November 19, 1945 for a Blind Landing System. This system involves a ground installation which, upon being challenged by echo ranging apparatus in an aircraft, radiates lobe-switched pulses from a pair of directional antennas, to define by the radiation field then produced, the position of the runway and the proper course path to effect a blind landing thereon. To sense these radiations and to provide indication in the aircraft of the axis of the runway and of the position of the aircraft, a receiving unit is provided in the aircraft comprising a dual-channel receiver and sensing unit, the channels of the receiver being coupled each to a directional receiving antenna at each side of the center of the aircraft and the sensing unit having timing and measuring circuits to compare the output of the two receiver channels and convert the comparative amplitude into a meter indication of the "crab" of the aircraft, i. e. relative heading of aircraft with respect to the bearing of the source of ground radiations, to compare the amplitude of the two radiated fields and indicate the equi-signal path defined by the two lobes and to sense the time occurrence of the pulses and indicate therefrom the range of the runway from the aircraft. To artificially generate and supply to this airborne component pulses manually controllable to simulate various ranges, course paths and "crab" headings in the receiving unit and to mix artificial interference radiations with these signals to determine the effect of interference on the system, the instant test instrument is designed.

Accordingly, it is an object of this invention to provide a novel test instrument for use in conjunction with a blind landing system.

Another object of the invention is to provide a test unit adapted to be used with an airborne position sensing component of a blind landing system to artificially generate signals such as those set up by the ground installation of a blind landing system to define the approach path to the runway.

Another object of the invention is to provide a test instrument adapted to be used with the airborne components of a blind landing system, the test instrument being manually controllable to simulate various known ranges, course paths and angles of bearing to calibrate the sensing circuits of the airborne components.

Other objects, advantages and capabilities of the invention will become apparent from the following description taken in conjunction with the accompanying drawings, showing only a preferred embodiment of the invention, in which.

Figure 1:
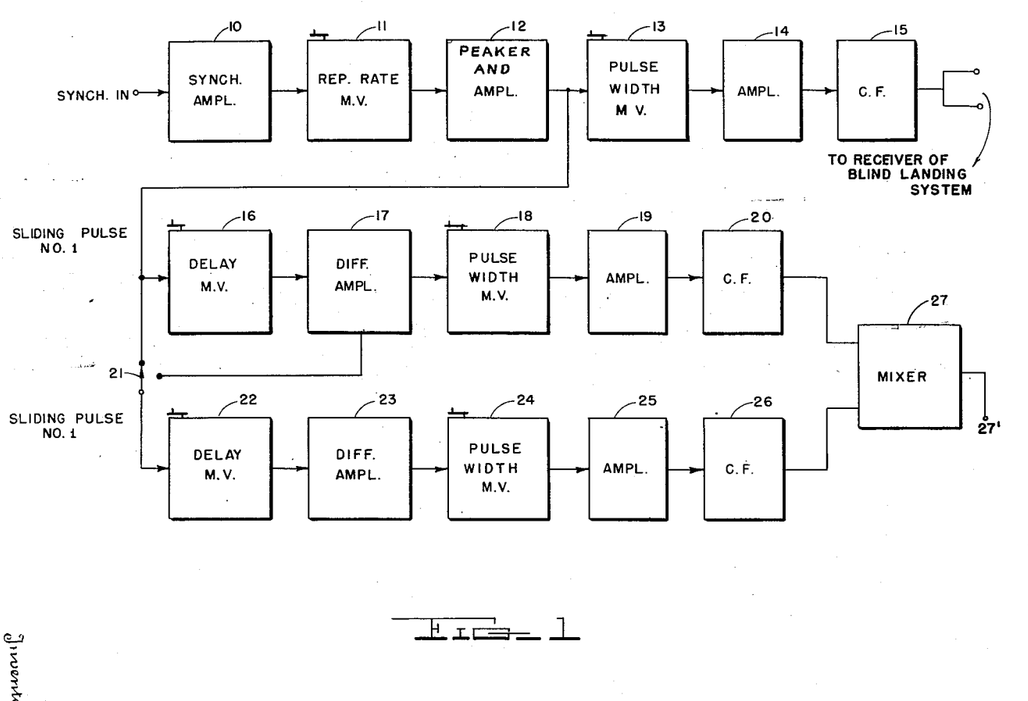
Fig. 1 is a block diagram of the pulse circuit component of the instant test instrument.

Referring now to Fig. 1, showing the block diagram of the pulsing unit, synchronizing signals generated by any conventional form of synchronizing pulse generator are fed into a synchronizing amplifier 10. These synchronizing pulses are employed to synchronize the test unit with a standard synchroscope so that waveforms tapped off at various points in the test unit may be observed thereon. The output of the synchronizing amplifier 10 is fed into a repetition rate multivibrator 11 which is manually controllable to simulate the pulse repetition frequency of a conventional echo ranging unit. The square wave output of the repetition rate multivibrator 11 is fed to an amplifier and peaker 12 which peaks the leading and trailing edges of the squarewave output of the repetition rate multivibrator 11 to produce a series of positive and negative pulses. These pulses are coupled to a pulse width multivibrator 13 which is manually controllable and triggered by the positive pulses produced in amplifier 12 to trigger the pulse width multivibrator 13 and generate a positive pulse which is a reference pulse of a duration determined by the setting of the manual control coupled thereto. This pulse output is coupled successively through an amplifier 14 and a cathode follower 15 from which the pulse may be tapped off and applied to the receiving unit of the blind landing system. This reference pulse of controllable repetition frequency serves as the cycle initiating pulse for the receiving and sensing units. The series of positive and negative pulses generated by amplifier 12 are also fed to a first sliding pulse strip, the input stage of which is a delay multivibrator 16 which is manually controllable to insert a predetermined amount of delay in its output trigger pulse with respect to the time of occurrence of the input pulses. These output pulses are coupled through a differential amplifier 17 to a pulse width multivibrator stage 18 which is also manually controllable to generate a pulse of predetermined duration when triggered by the output of amplifier 17. The pulse output of the pulse width multivibrator 18 is then coupled through an amplifier 19 and cathode follower stage 20 to a mixer stage 27 from which the pulse may be coupled into the receiving unit of the blind landing system. The pulse output of amplifier 12 may also be coupled into a second sliding pulse strip, the input stage of which is another manually controllable delay multivibrator 22. This stage, as in the case of the delay stage 16 in the first sliding pulse strip, is designed to introduce a selectable amount of delay into output trigger pulses with respect to the input pulses. The delayed pulse output of the delay multivibrator stage 22 is fed through a differential amplifier 23 to a pulse width multivibrator 24 which is likewise manually controllable to enable variation of the pulse width as desired. The pulse output of the pulse width multivibrator 24 is coupled through an amplifier 25 and a cathode follower stage 26 to the mixer stage 27, from which the mixed pulses generated in the two sliding pulse strips may be picked off and coupled to the receiving unit of the blind landing system. The variable delay and variable width pulses generated in this pulser circuit may be coupled from the mixer stage 27 above mentioned into the position simulating circuit shown in Fig. 2. This position simulating circuit enables a successive group of pulses picked off of the pulsing unit to be timed and shaped to simulate the range position of the aircraft, the relative bearing of the aircraft, and the proper approach path of the aircraft with respect to a runway.

Figure 2:
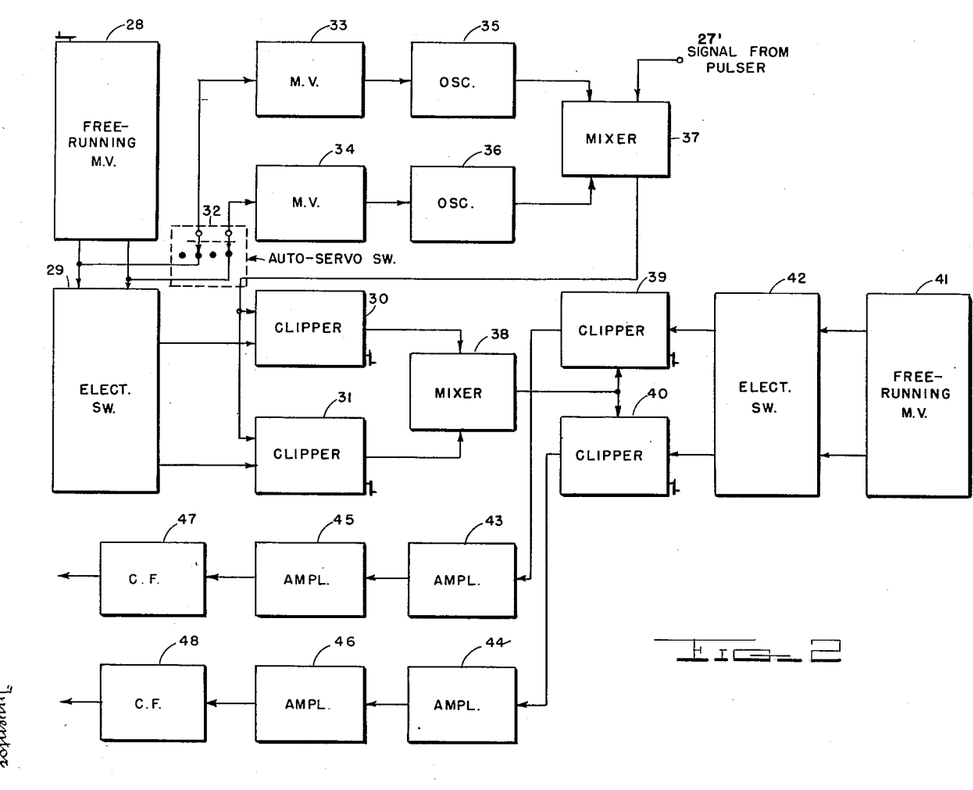
Fig. 2 is a block diagram of the position simulating circuit component of the instant system.

Referring therefore to Fig. 2 showing a block diagram of the position simulating circuit, I have provided a free running multivibrator 28, the switching period of which is manually controllable to simulate the antenna switching frequency of the antennas of the ground installation of the blind landing system. The output of the free running multivibrator 28 is then coupled into an electronic switch 29 designed to produce a flat-topped gating signal to alternately gate a pair of clipper amplifiers 30 and 31. The output of the free running multivibrator 28 is also coupled through an "automatic-servo" switch 32, when it is desired that the system operate on automatic, to a pair of gating multivibrators 33 and 34. These gating multivibrators 33 and 34 are alternately triggered to produce negative gates to cut off current flow in oscillators 35 and 36. Since the oscillators 35 and 36 are designed to oscillate at different natural frequencies and generate a series of modulated synchronizing signals, the alternate gating of multivibrators 33 and 34 produces alternately different frequency outputs from the oscillators 35 and 36 which are coupled into a mixer stage 37 where the modulated signals generated by the oscillators 35 and 36 are mixed with the signal coupled from the mixer output terminal of the pulser unit previously described. The frequency modulated pulse output of the mixer 37 is then coupled into the gated clipping amplifiers 30 and 31. The clipping amplifiers 30 and 31 are manually controllable to limit the amplitude of the pulses fed therethrough during the period when these amplifiers are conducting to simulate various amplitudes of pulse radiation, thus effectively varying the simulated equi-signal path. The gated outputs of the clipping amplifiers 30 and 31 are then coupled into a mixer 38 where the outputs are mixed in proper time relation and thence fed to gated clipping amplifiers 39 and 40.

The gating signals for the clipping amplifiers 39 and 40 are generated in the following manner. A free running multivibrator 41 is provided, the free running period of which is designed to simulate the antenna switching frequency of the airborne unit. The output of this free running multivibrator 41 is then coupled into an electronic switch 42 to produce a gating signal synchronized with the multivibrator output for gating the clipping amplifiers 39 and 40. The clipping amplifiers 39 and 40 are also manually controllable to limit the amplitude of the pulses fed therethrough to simulate various amplitudes of pulse signals picked up by the directional receiving antennas carried by the aircraft, and thus simulate the relative bearing of the aircraft with respect to its line of bearing from the runway. The outputs of these clipping amplifiers 39 and 40 are then coupled through a series of amplifier stages 43, 44, 45 and 46 into cathode followers 47 and 48, respectively, from which the pulse outputs of the two channels can be picked off and coupled into the video signal input channel of the receiving unit of the blind landing system.

By means of this position simulating circuit, control of the timing of alternate groups of pulses of predetermined width determined by the setting of the manual control in the pulser circuit has been provided to simulate the antenna switching characteristics of a ground approach path defining system. Likewise, means have been provided for varying the relative amplitude of alternate groups of pulses so that the aircraft may appear to be at various positions away from the equi-signal path of the radiation fields generated by the ground radiation. By means of the free running multivibrator 41 and the clipping amplifiers 39, 40, the relative amplitude and timing of groups of pulses in the receiver are effectively varied to simulate various orientations of the pair of receiving antennas into which the ground radiation patterns would be coupled, with respect to the hypothetical source of radiation and its bearing from the aircraft, and also the antenna switching frequency of the airborne unit. It should be noted that the clippers 39 and 40 are designed to have relative transfer efficiencies equal to the relative field strengths of the pair of antennas of the system disclosed in the previously mentioned copending application of T. R. Burnight et al. These transfer efficiencies are measured along a line extending between the airborne and the ground-located pairs of antennas when the aircraft equipment is in a simulated position.

Figure 3:
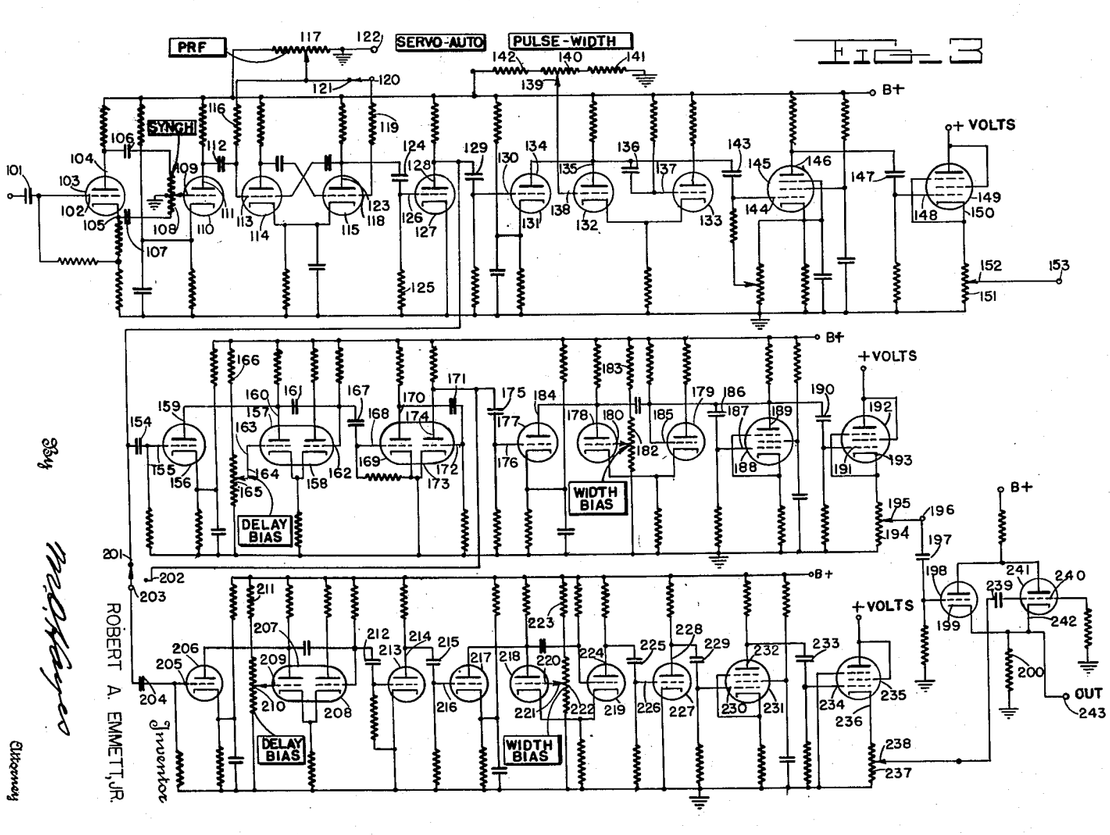
Fig. 3 is a schematic diagram of the pulser circuit component.

Referring now to the specific circuit details through which the position simulating circuits effect control of the repetition frequency and time delay of the pulses in the pulser unit, shown in Fig. 3, synchronizing pulses are coupled through condenser 101 to the grid 102 of tube 103 forming the synchronizing amplifier 10. The pulse output of the tube 103 is coupled from the plate 104 and cathode 105 thereof through condensers 106 and 107 to a center grounded resistor 108. Thus a signal of desirable amplitude and polarity may be picked off from the movable arm of the potentiometer 108 and fed to the grid 109 of amplifier 110. The amplified synchronizing pulses are then coupled from the plate 111 of the amplifier 110 through coupling condenser 112 to the grid 113 of tube 114 in the repetition rate multivibrator circuit 11. Tubes 114 and 115 are interconnected to form a conventional grid-plate coupled multivibrator. To provide manual control of the switching period of this multivibrator, the grid 113 of tube 114 is connected through a dropping resistor 116 to the variable arm of potentiometer 117 having a D. C. voltage applied thereacross. Likewise the grid 118 of tube 115 is coupled through a dropping resistor 119 to the movable arm 120 of an "automatic-servo" switch. The movable arm 120 of the "automatic-servo" switch is adapted to engage the switch terminal 121 when in "automatic" position to couple the resistor 119, and thus the grid 118, to the movable arm of the potentiometer 117. When in "servo" position, the movable arm 120 of the switch is adapted to engage a switch contact 122 which couples the grid 118 directly to ground instead of to the D. C. potential determined by the setting of the potentiometer arm 117. Thus by variation of the position of the arm of potentiometer 117, and thus the D. C. potential tapped off, the switching period of the multivibrator is thereby made to simulate the pulse repetition frequency of the ground installation. The squarewave output of the repetition rate multivibrator is coupled from the plate 123 of tube 115 through an R. C. peaker circuit comprising condenser 124 and resistor 125 to the grid 126 of tube 127 forming a conventional amplifier stage. The amplifier output, comprising a series of positive and negative pulses corresponding in time to the switching points of multivibrator 11, is coupled from the plate 128 of amplifier 127 through a coupling condenser 129 to the input grid 130 of the pulse width multivibrator comprising tubes 131, 132, and 133 intercoupled as a cathode coupled multivibrator. The plate 134 of tube 131 is coupled directly to the plate 135 of tube 132 and through a coupling condenser 136 to the grid 137 of tube 133. The grid 138 of tube 132 in the multivibrator circuit is coupled directly to the movable arm 139 of potentiometer 140 connected across a D. C. voltage in series with resistors 141 and 142. This potentiometer 140 provides a means of manually regulating the D. C. bias voltage on the grid 138 of tube 132 and thus the retriggering point of that tube i. e. the point at which tube 132 cuts off after it is caused to conduct by the initiating pulse. This stage provides variation of the delay inserted between the time of occurrence of the positive trigger pulses on the grid 130 of tube 131 and the trailing edge of the negative output at the plate 135 of tube 132. The pulses of selected width occurring at the plate 135 of tube 132 are coupled through a coupling condenser 143 to the grid 144 of a pentode amplifier 145. These pulses are merely amplified and inverted by the pentode 145 and coupled from the plate 146 thereof through condenser 147 to the grid 148 of the cathode follower output tube 149. The cathode 150 of tube 149 is coupled to ground through a potentiometer 151. Thus the amplitude of the pulses coupled from the movable arm 152 of potentiometer 151 may be controlled by varying the position of the arm 152. The pulses coupled out of output terminal 153 may be employed to synchronize the receiving and indicating unit of the blind landing system or of a test synchroscope to provide a proper time base for measuring the pulses.

The pulses at the plate 128 of amplifier tube 127 are likewise coupled through coupling condenser 154 to the input grid 155 of the pulse delay multivibrator 16 made up of tubes 156, 157, and 158 interconnected as a cathode coupled multivibrator. This delay multivibrator circuit is identical in its interconnection to the pulse width multivibrator circuit previously described, with the plate 159 of tube 156 coupled directly to the plate 160 of tube 157 and through condenser 161 to the grid 162 of tube 158. Likewise, the grid 163 of tube 157 is coupled directly to the movable arm 164 and potentiometer 165 connected between the positive D. C. plate supply voltage and ground through series resistor 166. The potentiometer 165 is provided to make possible manual control of the D. C. bias level on the grid 163 of tube 157, and the interval for which the tube 157 is cut off and thus the duration of the positive pulse produced on the plate 160. The trailing edge of this positive pulse is peaked by a short time constant input circuit in the succeeding stage to produce a negative pulse coincident therewith. Thus a manually controllable delay is inserted between the time occurrence of the pulses fed to the grid 155 of tube 156 and the negative pulses. This delayed pulse is coupled through condenser 167 to the grid 168 of amplifier tube 169. The amplified and inverted pulses occurring at the plate 170 of the amplifier 169 are then coupled through condenser 171 to the grid 172 of tube 173 forming another amplifier stage.

The high amplitude pulse output from the plate 174 of amplifier 173 is coupled through a condenser 175 to the input grid 176 of the pulse with multivibrator 18. Due to the time constant of the circuit parameters of the amplifier circuits 169 and 173, the trailing edge of the pulse output of the pulse delay multivibrator output tube 158 is differentiated to increase its time duration. The pulse width multivibrator comprising tubes 177, 178 and 179 is identical with the pulse width multivibrator 13 above described. The grid 180 of the second tube 178 of the pulse width multivibrator 18 is coupled directly to the movable arm of potentiometer 182 connected between the D. C. plate supply voltage and ground through D. C. resistors 183. This potentiometer 182 provides manual control of the D. C. bias voltage of the grid 180 of tube 178 and thus the cutoff period of tube 179 when triggered by the delayed pulse. Since the waveform coupled from the plate 184 of tube 177 to the grid 185 of multivibrator output tube 179 is a differentiated pulse, the D. C. bias voltage on the grid 180 of tube 178 determines the interval of time that will elapse between the leading edge of the pulse to plate 184 and the point at which the tube 179 after being cut off by the leading edge of the differentiated pulse, again begins to conduct, thus determining the pulse width. The pulse generated at the grid 185 of tube 179, the duration of which is manually determined, is coupled through the condenser 186 to the grid 187 of pentode amplifier tube 188. The amplified and inverted pulse output from the plate 189 of pentode 188 is then coupled through condenser 190 to the grid 191 of pentode 192 coupled as a cathode follower. The cathode 193 of pentode 192 is coupled to ground through a potentiometer 194, the variable arm 195 of which is connected to terminal 196 from which a pulse of varying amplitude can be picked off by varying the position of potentiometer arm 195 and fed through condenser 197 to the grid of triode 198 in the mixer stage 27.

The pulse output of the pulse amplifier 127, taken from the plate 128 thereof, is likewise coupled to the contact terminal 201 of the selector switch 21. When it is desired to delay the pulses in the second sliding pulse strip with respect to the initiating pulses from amplifier 127, the movable arm 203 coupled to the input grid 205 of the second pulse strip is positioned to engage switch contact 201. When it is desired, however, to delay the pulses in the second pulse strip with respect to the delayed pulses in the first pulse strip, the movable arm 203 of the selector switch is positioned to engage a contact 202 which couples the initiating pulses for the second sliding pulse strip from the plate 174 of differentiating amplifier 173 through the switch arm 203 to the grid 205 forming the input grid of the pulse delay multivibrator 22. This pulse delay multivibrator, identical in interconnection to the pulse delay multivibrator 13 above described includes tubes 206, 207, and 208. The grid 209 of tube 207 is coupled directly to the movable arm of potentiometer 210 connected between the D. C. plate supply voltage and ground through series resistance 211. This potentiometer 210, as potentiometer 165, is provided to enable manual control of the delay of the initiating pulses fed to the grid 205 of tube 206 to be effected in a well known manner. The trailing edge of the pulse generated at the grid of tube 208 in the multivibrator delay circuit is peaked to form a positive pulse by the input circuit of the next stage and is coupled to the grid of differentiating amplifier 213. The differentiated pulse produced thereby is coupled from the plate 214 through condenser 215 to the input grid 216 of pulse width multivibrator 24. The pulse width multivibrator 24 is likewise identical to the pulse width multivibrator 13, and includes tubes 217, 218 and 219. The grid 220 of tube 218 is coupled directly to the potentiometer arm 221 of potentiometer 222 connected between the D. C. plate supply and ground through series resistor 223. The potentiometer 222 is provided to enable manual control of the duration of the delayed pulse output of tube 213 by controlling the period of conduction of tube 218. The pulse of desired width thus appearing on the plate 224 of tube 219 is coupled through condenser 225 to the grid 226 of amplifier 227 and thence from the plate 228 thereof through condenser 229 to the grid 230 of pentode amplifier 231. The twice amplified pulse is then coupled from the plate 232 of tube 231 through condenser 233 to the grid 234 of pentode 235 connected as a cathode follower circuit. The cathode 236 of cathode follower tube 235 is coupled to ground through potentiometer 237, the variable arm 238 of which is coupled through condenser 239 to the grid 240 of tube 241 which, together with tube 198, forms the mixer stage 27. Here the sliding pulse output of the second sliding pulse strip is mixed with the pulse output of the first sliding pulse strip in the common cathode resistor 200 coupled to the cathode 242 of tube 241 and cathode 199 of tube 198. The mixed output of both pulse strips is taken off at the upper end of the common cathode resistor 200 and applied to the pulser output terminal 243 from which the delayed pulse output is then coupled to the position simulating circuits to be now described.

Figure 4:
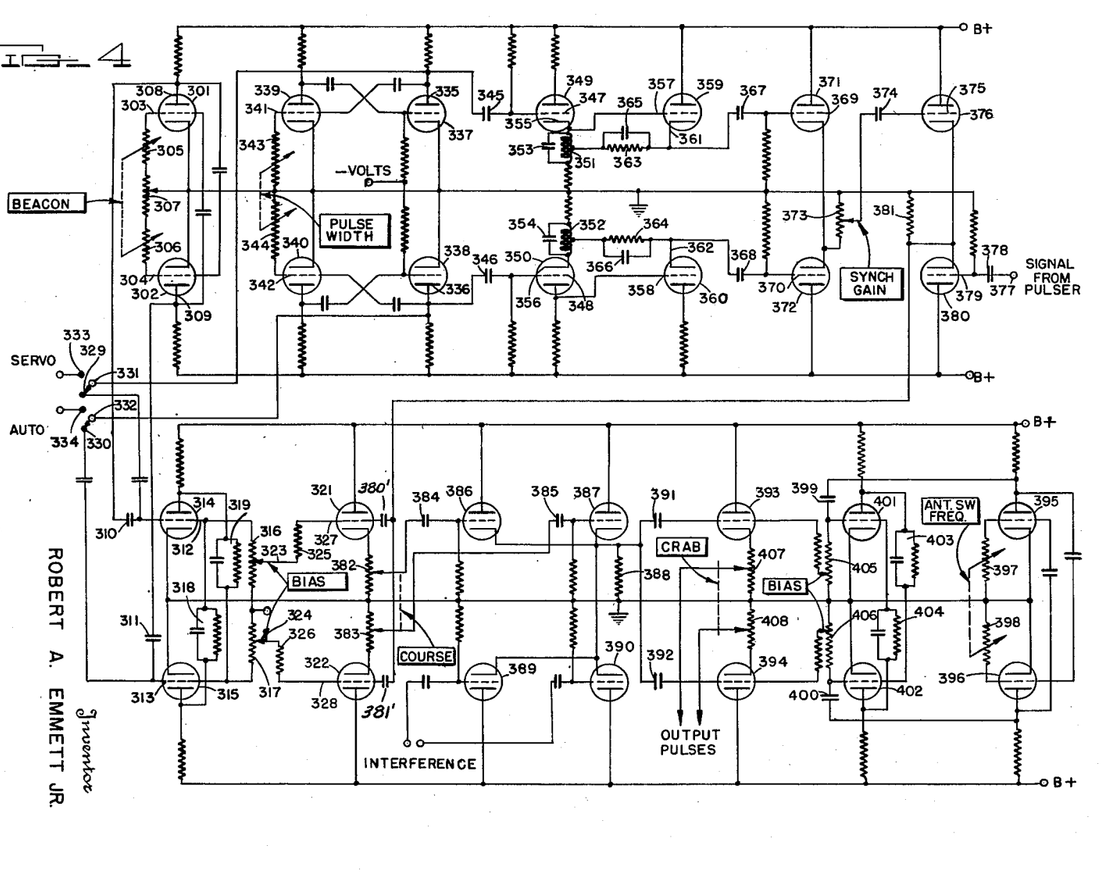
Fig. 4 is a schematic diagram of the manually controllable components of the simulating circuit.

Referring now to Fig. 4, in which are shown the circuit details by which the timing and shaping of the pulses are accomplished to simulate the various timing characteristics effected in the ground installation and the position and range characteristics of the pulses due to the position of the aircraft with respect to the ground installation. The free running multivibrator 28 comprises tubes 301 and 302 which are so interconnected as to form a conventional grid-plate coupled multivibrator. The grids 303 and 304 of tubes 301 and 302, respectively, are coupled to ground through variable resistors 305 and 306 and center tapped resistor 307. The variable resistors 305 and 306 provide manual control of the free running period of the multivibrator to simulate the various antenna switching frequencies which may characterize a ground installation. The output waveform at the plates 308 and 309 of tubes 301 and 302 forming the free running multivibrator are coupled through condensers 310 and 311, respectively, to the grids 312 and 313 of tubes 314 and 315 interconnected to form an electronic switch. The output waveforms of the multivibrator are peaked by resistor-capacitor combinations formed of the condensers 310 and resistor 316 coupled to the grid 312 and condenser 311 and resistor 317 coupled to grid 313. The tubes 314 and 315 are interconnected by means of resistor-capacitor combinations 318 and 319 connected between the grid of one tube and the plate of the other to produce a flat top gating waveform for alternately gating the tubes 321 and 322 forming the clipper amplifiers 30 and 31 shown at Fig. 2. This gating waveform is coupled from movable taps 323 and 324 at resistors 316 and 317 to pick off the desired amplitude of the gating pulse and feed through dropping resistors 325 and 326 to the grid 327 and 328 of clipper tubes 321 and 322. The lobe-switch simulating trigger waveform in the multivibrator 28 is likewise coupled from the grids 312 and 313 of electronic switch tubes 314 and 315 to terminals 329 and 330 of the "automatic-servo" switch 32. The terminals 329 and 330 are adapted to be engaged by the movable arms 331 and 332 of the "automatic-servo" switch to couple these triggers to the gating multivibrators 33 and 34. Additional switch terminals 333, 334 are positioned to be selectively engaged by the switch arms 331 and 332 when in "servo" position to synchronize the system with exterior generated synchronizing pulses. The trigger pulses coupled from the movable arms 331 and 332 of switch 32 are fed to the plates 335 and 336 of tubes 337 and 338 in the multivibrator gating circuit 33 and 34. The tubes 337 and 339, forming the multivibrator gate generator 33, are interconnected as a convention grid-plate coupled multivibrator, as are the tubes 338 and 340 forming the multivibrator 34. The grids 341 and 342 of tubes 339 and 340 are coupled to ground through variable resistors 343 and 344 to provide manual control to the switching periods of the multivibrator and thus the time duration of the output negative pulses on the plates 335 and 336. These negative output gating pulses are coupled from the plates 335 and 336 through coupling condensers 345 and 346 to the grids 347 and 348 of oscillator tubes 349 and 350. These oscillators are the conventional shock-excited type having tuned tank circuits comprising coils 351 and 352 and condensers 353 and 354 coupled between their cathodes 355 and 356, respectively, and ground. Directly coupled to the cathodes 355 and 356 of the tubes 349 and 350 are grids 357 and 358 of tubes 359 and 360. The cathodes of the tubes 359 and 360 are coupled to a center tap on the coils 351 and 352 through resistors 363 and 364 and condensers 365 and 366. Due to the feedback action in the cathode circuit of the tubes 359 and 360, the amplitude of the oscillations in the oscillator tank circuit is maintained substantially constant. Oscillator tubes 349 and 350 are normally conducting quite heavily. The negative pulse generated at one of the plates 335, 336 of tubes 337 and 338 when one of the multivibrators is triggered cuts off one of the oscillator tubes 349 and 350 and shock excites one of the coils 351 and 352. The succeeding oscillations are coupled from the cathodes 361 and 362 of feedback tubes 359 and 360 through coupling condensers 367 and 368 to the grids 369, 370 of amplifier tubes 371 and 372, the cathodes of the amplifier tubes 371 and 372 being coupled through a common cathode potentiometer 373 to ground. The variable arm of this potentiometer 373 couples a variable amplitude of the synchronizing signal through a coupling condenser 374 to the grid 375 of tube 376, one of the two tubes in the mixer stage 37. The output signal of the pulser circuit component shown in Fig. 1 is coupled into an input terminal 377 from which the pulse signal is fed through a coupling condenser 378 to the grid 379 of the tube 380, the other tube in mixer stage 37. The cathodes of the tubes 376 and 380 are coupled to ground through a common resistor 381, in which the synchronizing signals at the two modulation frequencies are mixed with the pulse output of the pulser unit to provide pulses mixed in proper time relation with synchronizing signals such as would be present in the received radiations of the ground installation of the blind landing system. These alternately modulated signals and pulses in the common cathode resistor 381 are also coupled to the grids 327 and 328 of the clipper tubes 321 and 322 through coupling condensers 380' and 381'. The cathodes of the triode clippers 321 and 322 are coupled through potentiometers 382 and 383 to ground. The variable arms of the potentiometers 382 and 383 are ganged together to provide simultaneous manual operation and the signal is coupled therefrom through condensers 384 and 385 to the grids of mixer triodes 386 and 387. The potentiometers 382 and 383 form the manual "course" control by which the relative amplitude of the gating signal output of the clippers 321 and 322 may be varied to simulate the field strengths which would be experienced at various points away from an equi-signal line of the switched lobes radiated by the ground approach path defining system. The cathodes of the mixer tubes 386 and 387 are coupled to ground through a common cathode resistor 388. Likewise coupled to the top of the common cathode resistor 388 are the cathodes of mixer tubes 389 and 390, into the grid of which may be selectively introduced various amplitudes of interference signals which may be mixed with the course defining pulses to simulate various atmospheric and spurious interferences which may be experienced in the reception of the ground radiated, course defining signals. The mixed interference and course defining pulses are then coupled from the top of the common cathode resistor 388 through coupling condensers 391 and 392 to clipper triodes 393 and 394. To simulate the gating frequency of the video switch in the dual channel receiving unit of the airborne echo-ranging unit of the blind landing system, a multivibrator comprising tubes 395 and 396 is provided, the tubes 395 and 396 being coupled together as a convention grid-plate coupled multivibrator. The grids of the tubes 395 and 396 are coupled to ground through variable potentiometers 397 and 398. The variable arms of potentiometers 397 and 398, coupled between the grids of the free running multivibrator tubes 395 and 396, are coupled together to provide accurate manual control of the switching period of the multivibrators, designed to simulate the switching period of the receiving antennas coupled to the dual channel receiver in the airborne unit of the blind landing system. The switching waveform at the plate of the tubes 395 and 396 is coupled through condensers 399 and 400 to the grid of triodes 401 and 402 forming an electronic switch for producing a flat topped gating pulse for the clipper amplifiers 393 and 394. The triodes 401 and 402 are intercoupled as conventional electronic switch stage with the resistor-capacitor networks 403 and 404 coupled between the plate of one tube and the grid of the opposing tube in the pair forming the electronic switch. Variable potentiometers 405 and 406 are coupled between the grids of the triodes 401 and 402 and ground, respectively. The movable arms of the potentiometers 405 and 406 are coupled through dropping resistors to the grid of the clipper triodes 393 and 394. Thus by variation of the position of the movable arm on the potentiometers 405 and 406, the desired amplitude of the alternating, gating waveform generated by the electronic switch 42 may be picked off and fed to the grids of the tubes 393 and 394 thus gating them alternately to simulate the switching of the channels of the dual channel receiver in the blind landing system.

The cathodes of the gated clipping triodes are coupled through variable potentiometers 407 and 408 to ground, the movable arms of which are ganged and manually controllable to alter the relative amplitudes of the alternately gated pulses to simulate various angles of orientation of the receiving antennas in the airborne component of the blind landing system with respect to the simulated source of ground radiation. The position simulating pulses generated by the circuit components just described are tapped from the movable arm of the potentiometers 407 and 408 and fed to the separate channel output stages shown in Fig. 5. The pulses coupled from the variable arm of the potentiometers 407 and 408 are fed through coupling condensers 409 and 410, shown in Fig. 5, to the control grids of pentode amplifiers 411, 412. The outputs of the amplifiers 411 and 412 are coupled through coupling condensers 415 and 416 to the control grids of another pair of pentode amplifiers 417 and 418. The twice amplified pulses are coupled from the plates of the amplifiers 417 and 418 through coupling condensers 421 and 422 to the control grids of pentode cathode followers 423 and 424. These cathode followers 423 and 424 form the output stages for the pulses from each gated channel, the cathodes of the amplifiers 423 and 424 being coupled to ground through variable potentiometers 425 and 426. Thus a variable amplitude pulse may be coupled from the movable arm of the potentiometers 425 and 426 in the cathode circuit of the cathode followers to the output terminals 427 and 428, so designed as to simulate the pulses which would be present in the output of the receiver channels associated with the right and left antennas of the airborne component of the blind landing system.

Figure 5:
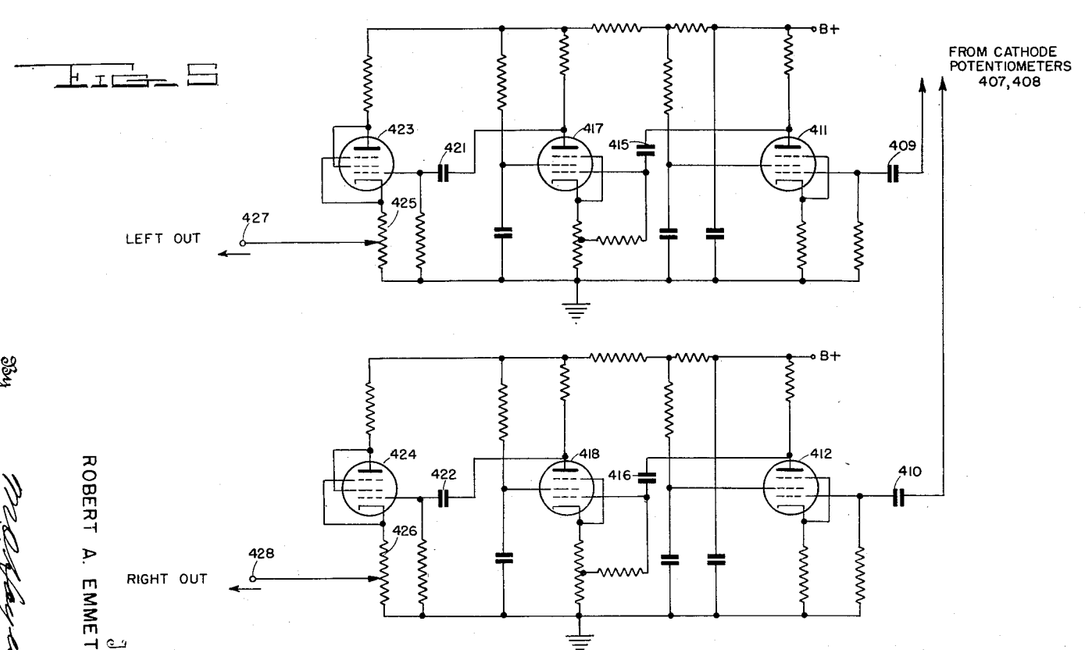
Fig. 5 is a schematic diagram of the output circuit coupled to the position simulating circuit unit.

In the two circuit units just described, we have thus provided manual control means for spacing and shaping the individual pulses generated in the pulser units in accordance with the various amplitude and time characteristics which would be imposed upon the pulses at various positions in the radiated fields generated by the ground installation of the blind landing system. It will be apparent that coupling of the pulses from the output terminals 427 and 428 to the input terminals of the sensing circuit in the airborne component of the blind landing system above referred to will provide calibrated pulses by which the accuracy and response of the airborne sensing unit can be tested, and by which the various metering circuits in the sensing unit for indicating course bearings, deviations from "on course" path, range, and the course of the aircraft may be accurately calibrated. Thus neither the cumbersome ground installation nor actual field test procedure are required to effectively test and calibrate the receiving unit.

Various modifications may be made in the invention without departing from the spirit and scope thereof.

The invention described herein may be manufactured and used by or for the Government of the United States of America without the payment of any royalties thereon or therefor.

What is claimed is:

1. Apparatus for simulating the video pulses obtained in the receiver output of a blind landing system utilizing an airborne pulse-transmitting and echo-receiving means including a first pair of directive receiving antennas having overlapping field patterns alternately connected to the radio receiver means and a ground located transmitting means triggered by the airborne transmitter having a second pair of directive antennas also having overlapping field patterns alternately fed with pulses of energy, comprising the combination of a first means for generating and initiating reference pulses of variable pulse repetition frequency, second means coupled to said first means operative in response to one of said reference pulses to generate at least one pulse having a variable time relation with said reference pulse in accordance with the simulated range position of the aircraft, generator means for generating a pair of time displaced signals each of which have different frequency characteristics, first mixing means coupled to said generating means and to said second means for mixing the outputs thereof, second mixing means coupled to said first mixing means for periodically varying the output signal received from said first mixing means between two amplitude levels, the relative amplitude levels being proportional to the relative field strengths of said second pair of antennas as would be measured at the simulated aircraft position, third and fourth means coupled to said second mixing means having relative transfer efficiencies equal to the relative field strengths of said first pair of antennas when measured along a line extending between said first and second pairs of antennas when said aircraft is in said simulated position, switching means coupled to said third and fourth means for making said third and fourth means alternately operative to couple the input pulses to the outputs thereof, the respective outputs of said third and fourth means simulating the pulses of energy which would be detected at the output of the respective antennas of said first pair of antennas.

2. Apparatus for simulating the video pulses obtained in the receiver output of a blind landing system utilizing an airborne pusle-transmitting and echo-receiving means including a first pair of directive receiving antennas having overlapping field patterns alternately connected to radio receiver means and a ground-locating transmitting means triggered by said airborne transmitting means having a second pair of directive antennas also having overlapping field patterns alternately fed with pulses of energy, comprising the combination of first means for generating and initiating reference pulses of variable pulse repetition frequency, second means coupled to said first means operative in response to one of said reference pulses to generate at least one pulse having a variable time relation with said reference pulse in accordance with the simulated range position of an aircraft, mixing means, third and fourth means coupled to said mixing means having relative transfer efficiencies equal to the relative field strengths of said second pair of antennas measured at said simulated aircraft position, switching means coupled to said third and fourth means for alternately rendering same operative to couple the input pulses to the output thereof, fifth and sixth means each coupled through said mixing means to said third and fourth means having relative transfer efficiencies equal to the relative field strengths of said first pair of antennas when measured along a line extending between said first and second pairs of antennas when said aircraft is in said simulated position, switching means coupled to said fifth and sixth means for making same alternately operative to couple the input pulses to the outputs thereof, the respective outputs of said fifth and sixth means simulating the pulses of energy which would be detected at the output of the respective outputs of said first pair of antennas.

3. The combination of a first means for continuously producing a series of pulses, second and third means coupled to said first means each having variable transfer efficiencies, mixing means, switching means coupled to said second and third means for alternately rendering same operative at a first given rate to couple the input pulses to the outputs thereof, fourth and fifth means each coupled through said mixing means to said second and third means each having variable transfer efficiencies, switching means coupled to said fourth and fifth means for alternately rendering same operative at a second rate different from said first rate to couple the input pulses to the outputs thereof.

4. The combination of a first means for continuously producing a series of reference pulses of variable pulse repetition frequency, second means coupled to said first means operative in response to one of said reference pulses to generate at least one pulse having a variable time relation with said reference pulse, third and fourth means coupled to said second means each having variable transfer efficiencies, a mixer, switching means coupled to said third and fourth means for alternately rendering same operative at a first given rate to couple the input pulses to the outputs thereof, fifth and sixth means each coupled through said mixer to said third and fourth means each having variable transfer efficiencies, switching means coupled to said fifth and sixth means for alternately rendering same operative at a second rate different from said first rate to couple the input pulses to the outputs thereof.

5. The combination of a first means for continuously producing a series of pulses, a second and third means coupled to said first means each having variable transfer efficiencies, switching means coupled to said second and third means for alternately rendering same operative at a first given rate to couple the input pulses to the outputs thereof, fourth and fifth means each coupled to said second and third means each having variable transfer efficiencies, switching means coupled to said fourth and fifth means for alternately rendering same operative at a second rate different from said first rate to couple the input pulses to the outputs thereof, a mixer, said second and third means being connected to said fourth and fifth means through said mixer.

6. Apparatus for simulating the video pulses obtained in the receiver output of a blind landing system utilizing an airborne pulse-transmitting and echo-receiving means including a first pair of directive receiving antennas having overlapping field patterns alternately connected to the radio receiver means and a ground-located transmitting means triggered by the airborne transmitter having a second pair of directive antennas also having overlapping field patterns alternately fed with pulses of energy, comprising the combination of a first means for continuously producing a series of reference pulses of variable pulse repetition frequency, second means coupled to said first means operative in response to one of said reference pulses to generate at least one pulse having a variable time relation with said reference pulse, third and fourth means coupled to said second means each having variable transfer efficiencies, switching means coupled to said third and fourth means for alternately rendering same operative at a first given rate to couple the input pulses to the outputs thereof, fifth and sixth means each coupled to said third and fourth means each having variable transfer efficiencies, switching means coupled to said fifth and sixth means for alternately rendering the same operative at a second rate different from said first rate to couple the input pulses to the outputs thereof, a mixer, said third and fourth means being connected to said fifth and sixth means through said mixer.

ROBERT A. EMMETT, Jr.

REFERENCES CITED

The following references are of record in the file of this patent:

UNITED STATES PATENTS

| Number | Name | Date |
|---|---|---|
| 2,181,568 | Kotowski | Nov. 28, 1939 |
| 2,262,838 | Deloraine | Nov. 18, 1941 |
| 2,373,145 | Sensiper | Apr. 10, 1945 |
| 2,401,432 | Luck | June 4, 1946 |
| 2,440,261 | Ginzton | Apr. 27, 1948 |
| 2,493,774 | Moore | Jan. 10, 1950 |
| 2,597,297 | Corson et al. | May 20, 1952 |